United States Patent
Kawagishi

(10) Patent No.: US 8,478,337 B2
(45) Date of Patent: Jul. 2, 2013

(54) NAVIGATION DEVICE AND ADAPTIVELY-CONTROLLED COMMUNICATION SYSTEM

(75) Inventor: Toshio Kawagishi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 281 days.

(21) Appl. No.: 12/934,579

(22) PCT Filed: Feb. 20, 2009

(86) PCT No.: PCT/JP2009/000732
§ 371 (c)(1),
(2), (4) Date: Sep. 24, 2010

(87) PCT Pub. No.: WO2009/144859
PCT Pub. Date: Dec. 3, 2009

(65) Prior Publication Data
US 2011/0014946 A1    Jan. 20, 2011

(30) Foreign Application Priority Data
May 30, 2008   (JP) .................... 2008-142564

(51) Int. Cl.
*H04M 1/00*   (2006.01)
(52) U.S. Cl.
USPC ............. 455/556.1; 455/420; 455/456.1; 455/456.3; 455/456.6; 455/569.2; 701/400; 701/430; 701/450; 701/451; 701/452; 340/988; 340/989; 340/992; 340/993; 342/454

(58) Field of Classification Search
USPC ............. 455/456.1, 456.2, 456.6, 420, 456.3, 455/556.1, 569.2; 701/32.4, 412, 468, 470, 701/471, 430, 450, 451, 452, 400; 340/988, 340/989, 992, 993; 342/450, 454
See application file for complete search history.

(56) References Cited

U.S. PATENT DOCUMENTS

| | | | |
|---|---|---|---|
| 2003/0050753 A1* | 3/2003 | Ihara et al. | ............ 701/208 |
| 2006/0178817 A1* | 8/2006 | Suzuki et al. | ............ 701/209 |
| 2006/0223592 A1 | 10/2006 | Kouno | |
| 2007/0070938 A1 | 3/2007 | Hori et al. | |
| 2009/0061898 A1* | 3/2009 | Johnson et al. | ............ 455/456.2 |

FOREIGN PATENT DOCUMENTS

| | | |
|---|---|---|
| JP | 10-89984 A | 4/1998 |
| JP | 11-220768 A | 8/1999 |
| JP | 2000-295652 A | 10/2000 |
| JP | 2001-119452 A | 4/2001 |
| JP | 2002-296045 A | 10/2002 |
| JP | 2006-157746 A | 6/2006 |

(Continued)

*Primary Examiner* — Anthony Addy
*Assistant Examiner* — Amanuel Lebassi
(74) *Attorney, Agent, or Firm* — Birch, Stewart, Kolasch & Birch, LLP

(57) ABSTRACT

A navigation device (a vehicle-mounted navigation device 1) is connected, via a mobile communication network 3, to a server 5 by way of a telephone 2 connected thereto via cable 1a or radio 1b, and includes a communication control unit 12 for communicating with the server 5 by using the telephone 2 to measure parameter information about a command support status of the telephone 2 or a communication connection environment, and a main control unit 10 for transmitting the parameter information measured by the communication control unit 12 to an external storage medium 21 or the server 5, and for controlling subsequent communications according to the parameter information transmitted to the external storage medium 21 or the server 5.

11 Claims, 12 Drawing Sheets

FOREIGN PATENT DOCUMENTS

| | | |
|---|---|---|
| JP | 2006-287772 A | 10/2006 |
| JP | 2007-96522 A | 4/2007 |
| JP | 2007-318354 A | 12/2007 |
| WO | WO 2007/101714 A2 | 9/2007 |
| WO | WO 2007/101718 A2 | 9/2007 |

\* cited by examiner

FIG.2

| No. | Carrier | Telephone Name | Connection Type | Software Version | Supported Command #1 | Supported Command #2 | ... | Supported Command #N |
|---|---|---|---|---|---|---|---|---|
| 1 | COM A | A | Radio | 1 | ○ | ○ | ⋮ | ○ |
| 2 | COM A | A | Cable | 1 | ○ | ○ | ⋮ | ○ |
| 3 | COM A | B | Radio | 3 | × | ○ | ⋮ | × |
| 4 | COM A | B | Cable | 3 | × | ○ | ⋮ | × |
| 5 | COM B | C | Cable | 1 | ○ | ○ | ⋮ | ○ |
| 6 | COM B | D | Radio | 1 | ○ | ○ | ⋮ | ○ |
| 7 | COM C | E | Radio | 4 | ○ | ○ | ⋮ | ○ |
| ... | ... | ... | ... | ... | ... | ... | ... | ... |

| Area | Carrier | Communication Method | Radio Wave Level | Connection Response Time | Number of Connections | Transmission Rate |
|---|---|---|---|---|---|---|
| 1 | COM A | Method A | 5 | 6 | 1 | 100 |
| 2 | COM A | Method A | 5 | 6 | 1 | 100 |
| 3 | COM A | Method A | 5 | 6 | 1 | 100 |
| 4 | COM A | Method A | 4 | 6 | 1 | 100 |
| 5 | COM A | Method A | 4 | 6 | 1 | 100 |
| 6 | COM A | Method A | 3 | 7 | 1 | 90 |
| 7 | COM A | Method A | 1 | 7 | 2 | 30 |
| ⋮ | ⋮ | ⋮ | ⋮ | ⋮ | ⋮ | ⋮ |
| N | COM A | Method A | 5 | 10 | 1 | 50 |

(b)

| Area | Carrier | Communication Method | Radio Wave Level | Connection Response Time | Number of Connections | Transmission Rate |
|---|---|---|---|---|---|---|
| 1 | COM A | Method B | 5 | 7 | 1 | 50 |
| 2 | COM A | Method B | 5 | 7 | 1 | 50 |
| 3 | COM A | Method B | 5 | 7 | 1 | 50 |
| 4 | COM A | Method B | 4 | 7 | 1 | 50 |
| 5 | COM A | Method B | 4 | 7 | 1 | 50 |
| 6 | COM A | Method B | 5 | 8 | 1 | 50 |
| 7 | COM A | Method B | 5 | 8 | 2 | 50 |
| ⋮ | ⋮ | ⋮ | ⋮ | ⋮ | ⋮ | ⋮ |
| N | COM A | Method B | 2 | 11 | 1 | 10 |

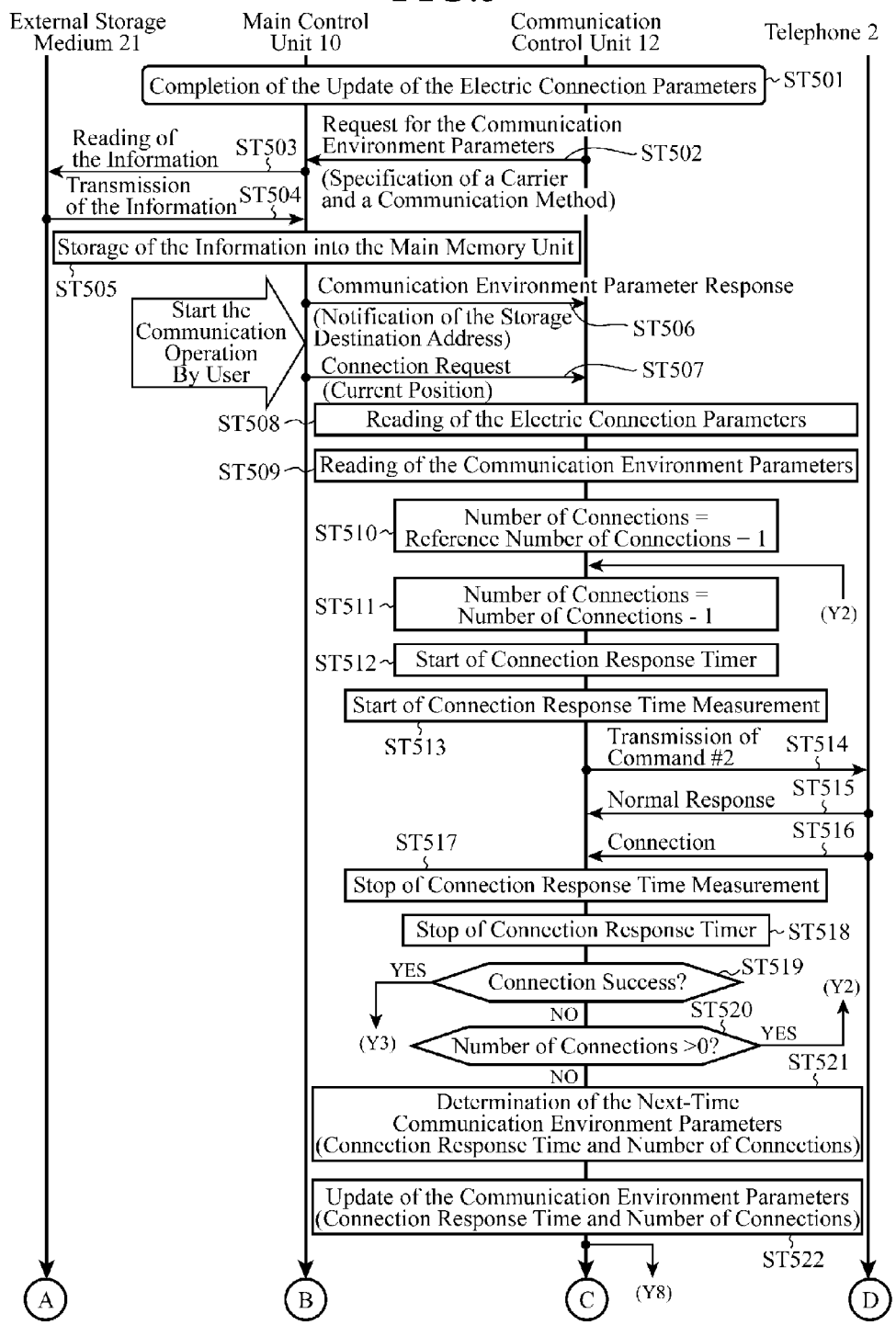

| Reference Timer [Second] : (1) | 1 | 1 | 3 | 2 | 2 | 1 | ... | |
|---|---|---|---|---|---|---|---|---|
| Actual Response Time [Second] : (2) | 1 | 3 | 2 | * | 1 | 1 | ... | |
| (3)=(2)-(1)[Second] | 0 | 2 | -1 | * | -1 | 0 | ... | |
| Next-Time Reference Timer [Second] Value of (Current Reference Timer + (3)) | 1 | 3 | 2 | 2 | 1 | 1 | ... | |

(b)

| Reference Number of Connections : (4) | 1 | 1 | 3 | 2 | 1 | 1 | ... | |
|---|---|---|---|---|---|---|---|---|
| Actual Number of Connections : (5) | 1 | 3 | 2 | 1 | 1 | 1 | ... | |
| (6)=(5)-(4)[Second] | 0 | 2 | -1 | -1 | 0 | 0 | ... | |
| Next-Time Reference Number of Connections Value of (Current Reference Number of Connections + (6)) | 1 | 3 | 2 | 1 | 1 | 1 | ... | |

| Connection Response Time | Number of Times | Accumulated Value | Accumulation Ratio |
|---|---|---|---|
| Equal to or Longer Than 0 Seconds and Shorter Than 1 Second | 0 | 0 | 0% |
| Equal to or Longer Than 1 Second and Shorter Than 2 Seconds | 10 | 10 | 13% |
| Equal to or Longer Than 2 Seconds and Shorter Than 3 Seconds | 50 | 60 | 75% |
| Equal to or Longer Than 3 Seconds and Shorter Than 4 Seconds | 15 | 75 | 94% |
| Equal to or Longer Than 4 Seconds and Shorter Than 5 Seconds | 5 | 80 | 100% |
| Equal to or Longer Than 5 Seconds and Shorter Than 6 Seconds | 0 | 80 | 100% |

(b)

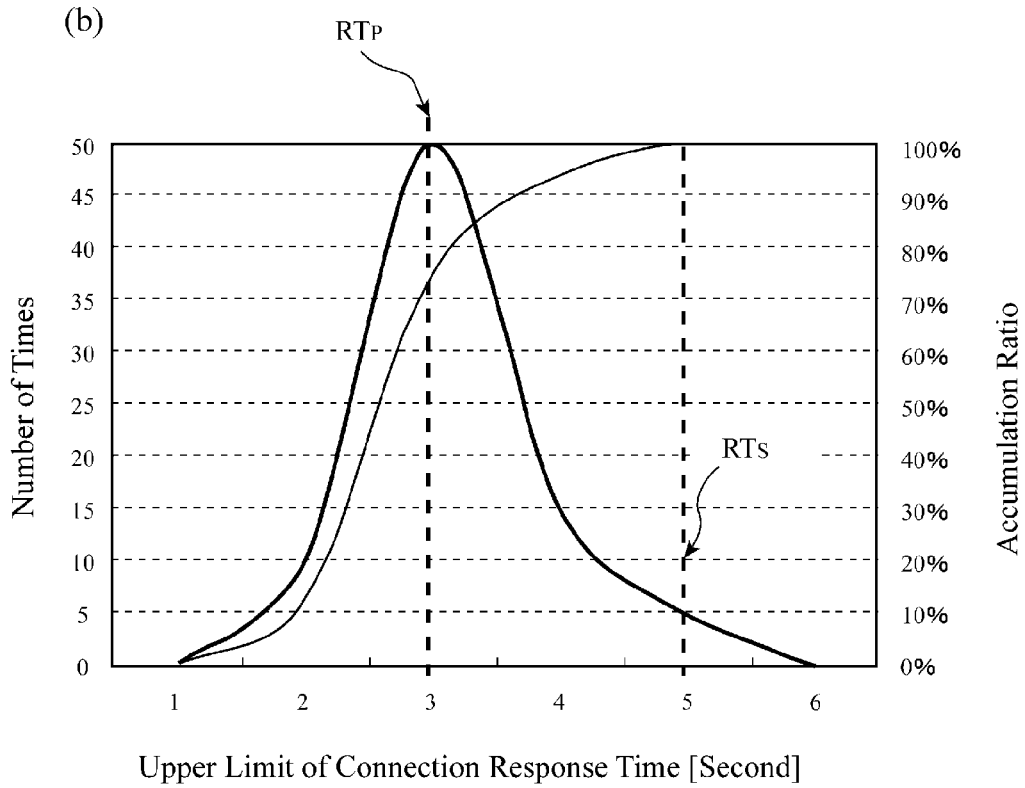

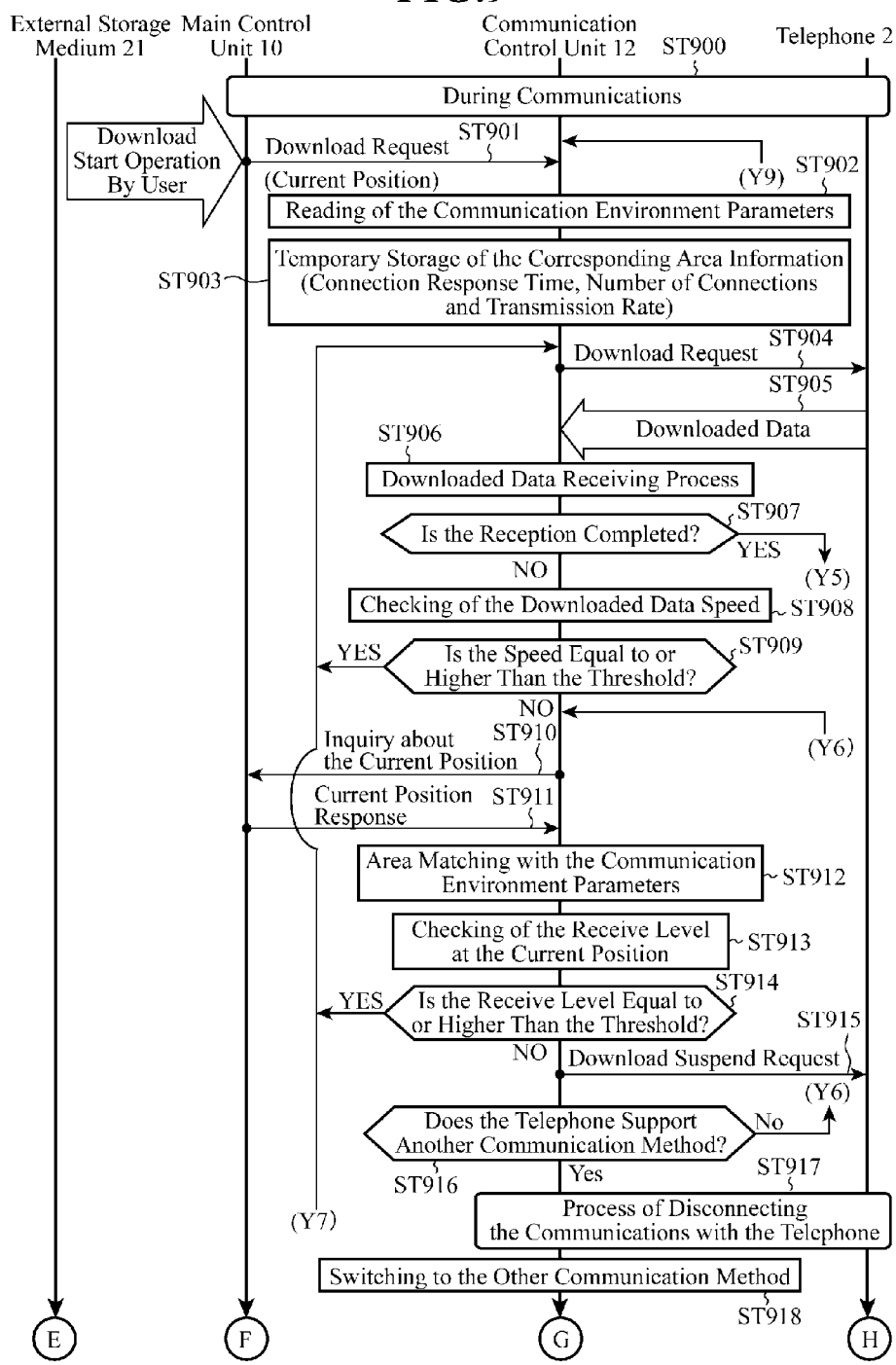

NAVIGATION DEVICE AND ADAPTIVELY-CONTROLLED COMMUNICATION SYSTEM

FIELD OF THE INVENTION

The present invention relates to a navigation device that is connected, via a mobile communication network, to a server byway of a telephone connected thereto via cable or radio, and an adaptively-controlled communication system.

BACKGROUND OF THE INVENTION

Recent years have seen an online demand traffic parameter information service system via mobile phone connections in a field of vehicle-mounted navigation.

When a user which uses a navigation device sets his or her destination in a state which his or her own mobile phone is connected to this system, the navigation device is connected to a server at a parameter information center and starts destination guidance. This system also provides a service for update of maps, traffic congestion prediction, and a service of working hand-in-hand with Web (World Wide Web) sites on the Internet, and the user can enjoy these services.

By the way, a conventional navigation device that, in a communication system with which a mobile phone as mentioned above can connect, judges a call enable area and a call disable area which were informed to the navigation device in advance is known (refer to, for example, patent references 1, 2, and 3). More specifically, the navigation device matches call area parameter information with the field intensity at the vehicle position and judges whether the navigation device can make a phone call in the area, thereby being able to judge whether the navigation device can make a phone call in advance.

[Patent reference 1] JP,2000-295652,A
[Patent reference 2] JP,2006-157746,A
[Patent reference 3] JP,10-89984,A However, although the technologies disclosed by above-mentioned patent references 1, 2, and 3 are effective in that the user can judge whether the navigation device can make a phone call in the area, either of them goes no further than matching the call area parameter information with the field intensity to judge whether the navigation device can make a phone call in the area, and does not take actual phone call conditions, e.g., a network traffic congestion condition into consideration.

Therefore, switching to a communication method in the area or useless communications occur, and this results in a load of an operation of handling communications for the switching or the useless communications being imposed on the user. Furthermore, because it is assumed that the mobile phone which the user uses can certainly establish a connection with the navigation device, in a case in which the mobile phone does not support the connection commands of the navigation device, the user simply cannot use the mobile phone to operate the navigation device or has to perform an operation of updating the software of the navigation device.

The present invention is made in order to solve the above-mentioned problems, and it is therefore an object of the present invention to provide a navigation device and an adaptively-controlled communication system that can reduce the load imposed on the user and carry out communications while preventing useless communications from occurring.

DESCRIPTION OF THE INVENTION

In order to solve the above-mentioned problems, in accordance with the present invention, there is provided a navigation device connected, via a mobile communication network, to a server by way of a telephone connected thereto via cable or radio, the navigation device including: a communication control unit for communicating with the above-mentioned server by using the above-mentioned telephone to measure parameter information about a command support status or communication connection environment of the above-mentioned telephone; and a main control unit for transmitting the parameter information measured by the above-mentioned communication control unit to an external storage medium or the above-mentioned server, and for controlling subsequent communications according to the parameter information transmitted to the above-mentioned external storage medium or the above-mentioned server.

In accordance with another aspect of the present invention, there is provided an adaptively-controlled communication system provided with one or more navigation devices each connected, via a mobile communication network, to a server by way of a telephone connected thereto via cable or radio, and an information management device connected to the above-mentioned one or more navigation devices via the above-mentioned mobile communication network, the above-mentioned navigation device including a communication control unit for communicating with the above-mentioned server by using the above-mentioned telephone to measure parameter information about a command support status or communication connection environment of the above-mentioned telephone, and a main control unit for transmitting the parameter information measured by the above-mentioned communication control unit to an external storage medium or the above-mentioned server, and for controlling subsequent communications according to the parameter information transmitted to the above-mentioned external storage medium or the above-mentioned server, and the above-mentioned information management device including a storage unit for storing the parameter information about the command support status or communication connection environment of the above-mentioned telephone which is transmitted thereto from the above-mentioned navigation device, and a parameter information transmission controlling unit for updating the parameter information stored in the above-mentioned storage unit in response to an update request from the above-mentioned navigation device, and for transmitting the updated parameter information stored in the above-mentioned storage unit to the above-mentioned navigation device which has made the request in response to a transmission request from the above-mentioned navigation device.

According to the present invention, the navigation device and the adaptively-controlled communication system that can reduce the load imposed on the user and carry out communications while preventing useless communications from occurring can be provided.

BRIEF DESCRIPTION OF THE FIGURES

FIG. 2 is a view showing an example of the data structure of an electric connection parameter file for use in the vehicle-mounted navigation device 1 in accordance with Embodiment 1 of the present invention;

FIG. 4 is a view showing an example of the data structure of a communication environment parameter file for use in a vehicle-mounted navigation device 1 in accordance with Embodiment 2 of the present invention;

FIG. 5 is a flow chart (1) showing a communication environment parameter file updating process carried out by the vehicle-mounted navigation device 1 in accordance with Embodiment 2 of the present invention;

FIG. 7 is a view showing an example of a method of measuring a connection response time and the number of connections of the vehicle-mounted navigation device 1 in accordance with Embodiment 2 of the present invention in a tabular form;

FIG. 8 is a view shown in order to explain an optimal reference value measuring method with a statistical process of the vehicle-mounted navigation device 1 in accordance with Embodiment 2 of the present invention;

FIG. 9 is a flow chart showing a first stage of an optimal communication control operation of a vehicle-mounted navigation device 1 in accordance with Embodiment 3 of the present invention;

PREFERRED EMBODIMENTS OF THE INVENTION

In order to explain the invention in greater detail, the preferred embodiments of the invention will be explained below with reference to the accompanying figures.

Embodiment 1.

Figure 1:
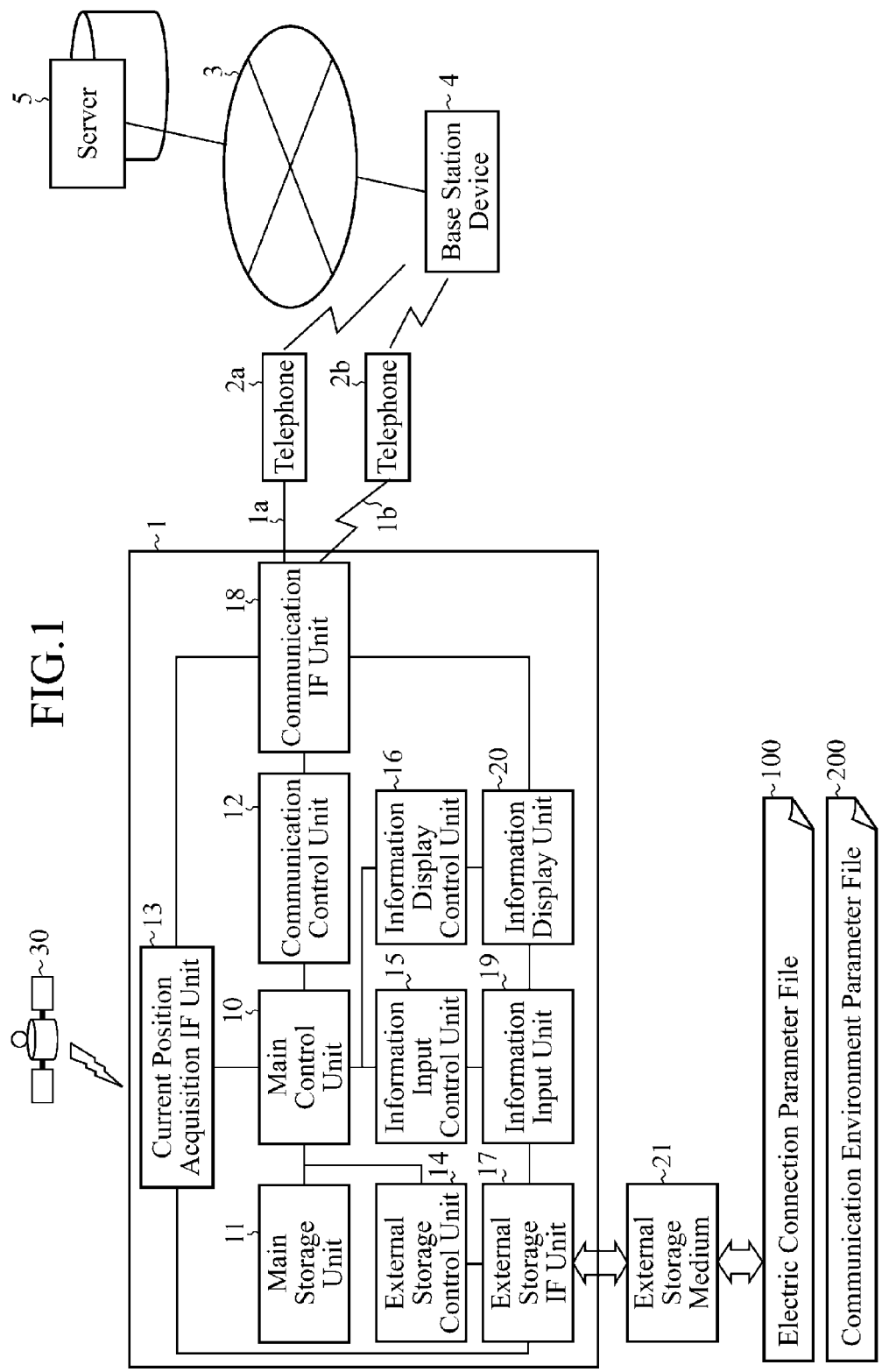
FIG. 1 is a block diagram showing the configuration of a vehicle-mounted navigation device 1 and an adaptively-controlled communication system in accordance with Embodiment 1 of the present invention.

FIG. 1 is a block diagram showing the configuration of a navigation device and an adaptively-controlled communication system in accordance with Embodiment 1 of the present invention. In this embodiment, a vehicle-mounted navigation device 1 mounted in a vehicle will be explained as an example of the navigation device.

As shown in FIG. 1, the adaptively-controlled communication system in accordance with Embodiment 1 of the present invention is connected to both a base station device 4 which is a network side connecting device connected, via a mobile communication network 3, to a telephone 2 connected to the vehicle-mounted navigation device 1 via cable or radio, and a server 5.

In this case, a telephone connected, via cable, to the vehicle-mounted navigation device refers to a mobile phone 2a connected to the vehicle-mounted navigation device 1 via a serial communication cable 1a, such as a USB (Universal Serial Bus) or RS232C cable. Furthermore, a telephone connected, via radio, to the vehicle-mounted navigation device refers to a mobile phone 2b connected to the vehicle-mounted navigation device 1 via short distance radio communications 1b, such as BlueTooth (registered trademark), radio LAN (Local Area Network), or UWB (Ultra Wide Band).

As shown in FIG. 1, the vehicle-mounted navigation device 1 is comprised of a main control unit 10, a main storage unit 11, a communication control unit 12, a current position acquisition IF unit 13, an external storage control unit 14, an information input control unit 15, an information display control unit 16, an external storage IF unit 17, a communication IF unit 18, an information input unit 19, an information display unit 20, and an external storage medium 21. IF stands for interface.

The main control unit 10 serves as the control center of the vehicle-mounted navigation device 1 and controls each of the above-mentioned blocks 13 to 21 according to a program stored in the main storage unit 11. In this embodiment, the main control unit 10 also transmits parameter information measured by the communication control unit 12 to the external storage medium 21 or the server 5, and controls subsequent communications according to the parameter information (an electric connection parameter file 100 and a communication environment parameter file 200 which will be mentioned below) which the main control unit has transmitted to the external storage medium 21 or the server 5.

The communication control unit 12 manages the whole of communication control under the control of the main control unit 10. In this embodiment, the communication control unit communicates with the server 5 via the telephone 2 (the telephone 2a connected, via cable, to the network (referred to as the wired telephone from here on) or the telephone 2b connected, via radio, to the network (referred to as the wireless telephone from here on), the base station device 4, and the mobile communication network 3, and measures parameter information about a command support status or communication connection environment of the telephone 2 and outputs the parameter information to the main control unit 10.

When a connection with the telephone 2 is detected, the communication control unit 12 inquires of the telephone 2 about the telephone's name, and acquires the parameter information about the command support status of the corresponding telephone from the external storage medium 21 or the server 5 via the main control unit 10. The communication control unit 12 then determines the command support status via communications with the telephone 2 and the server 5, and, when there is a difference between the results of this determination and the acquired parameter information about the command support status of the corresponding telephone 2, transmits parameter information corresponding to this difference to the main control unit 10.

At this time, the main control unit 10 updates the parameter information about the command support status of the telephone which has been transmitted to the external storage medium 21 or the server 5 on the basis of the parameter information corresponding to the difference which is transmitted from the communication control unit 12. Hereafter, an explanation will be made by referring to this parameter information as the electric connection parameter file 100.

The communication control unit 12 also specifies a carrier and a communication method, and acquires the parameter information about the communication connection environment from the external storage medium 21 or the server 5 via the main control unit 10. At the time when a communication connection is started and receiving a communication connection request from the main control unit 10, the communication control unit 12 tries to establish a connection with the telephone 2 according to the parameter information about the communication connection environment which the communication control unit has acquired previously. After having succeeded in establishing a connection with the telephone and then making a transition to a communication state, the communication control unit 12 measures, via communications with the server 5, the parameter information about the communication connection environment including at least a connection response time and the number of connections. When there is a difference between the results of this measurement and the parameter information about the communication connection environment which the communication control unit has acquired previously, the communication control unit transmits parameter information corresponding to the difference to the main control unit 10 at the time when the communication control unit fails in communicating with the telephone 2 or the communications are disconnected.

At this time, the main control unit 10 updates the parameter information about the communication connection environment which the main control unit has transmitted to the external storage medium 21 or the server 5 on the basis of the parameter information corresponding to the difference which is transmitted from the communication control unit 12. Hereafter, an explanation will be made by referring to this parameter information as the communication environment parameter file 200.

The current position acquisition IF unit 13 acquires information regarding latitude, longitude, and time from GPS satellites 30 to determine the current position of the vehicle, and outputs the measured current position information to the main control unit 10.

The external storage control unit 14 performs read/write control of the electric connection parameter file 100 or the communication environment parameter file 200 from and into the external storage medium 21 connected thereto via the external storage IF unit 17 under the control of the main control unit 10.

In this embodiment, a memory card, a USB memory, or the like consisting of a nonvolatile storage element, such as a flash memory, can be used as the external storage medium 21.

The information input control unit 15 acquires parameter information about a telephone connection environment including the supported command status, or the communication connection environment, the parameter information being inputted through the user's operation on the information input unit 19, and outputs the parameter information to the main control unit 10.

The information display control unit 16 writes display information created by the main control unit 10 into a not-shown display memory, and reads the display information written into the display memory from the display memory in synchronization with the display timing of the information display unit 20, and displays the display information on the information display unit 20. The information input unit 19 and the information display unit 20 cay be constructed of, for example, an integral-type LCD (Liquid Crystal Display) touch panel as a display input device.

The communication IF unit 18 serves as an interface between the vehicle-mounted navigation device 1 and the telephone 2 connected to the vehicle-mounted navigation device 1. In the case of wired connection, the communication IF unit carries out data communications between the telephone 2 and the vehicle-mounted navigation device 1 according to a USB-based or RS232C-based communications protocol. In the case of wireless connection, the communication IF unit carries out data communications between the telephone 2 and the vehicle-mounted navigation device 1 according to a communication protocol based on short distance radio communications.

FIG. 2 is a view showing an example of the data structure of the electric connection parameter file 100 created by the navigation device (the vehicle-mounted navigation device 1) in accordance with Embodiment 1 of the present invention.

As shown in FIG. 2, each entry of the electric connection parameter file 100 is comprised of data fields of telephone set number 101, carrier 102, telephone name 103, connection method 104, software version 105, and supported commands #1 to #N (106).

As mentioned above, the navigation device in accordance with Embodiment 1 of the present invention records, as the electric connection parameter file 100, the carrier 102 which sells the telephone, the telephone name 103, the connection method 104 showing either wired connection or wireless connection, the version information (software version) 105 of the software which the telephone 2 has, and the support status 106 of each of the commands (supported commands) exchanged between the vehicle-mounted navigation device 1 and the telephone 2 at the time when a communication connection is established according to the type 101 of the telephone 2 connected to the vehicle-mounted navigation device 1. By utilizing the electric connection parameter file at the time of a next-time connection and subsequent connections with the telephone 2, the navigation device improves the connectivity thereof with the telephone, as will be explained below.

In this case, the supported commands 106 refer to, for example, AT commands used for control of a modem or the like, and each shown by a character string starting from AT. There are various AT commands regarding dialing, command echo, connection and disconnection of a channel, escape, etc.

Figure 3:
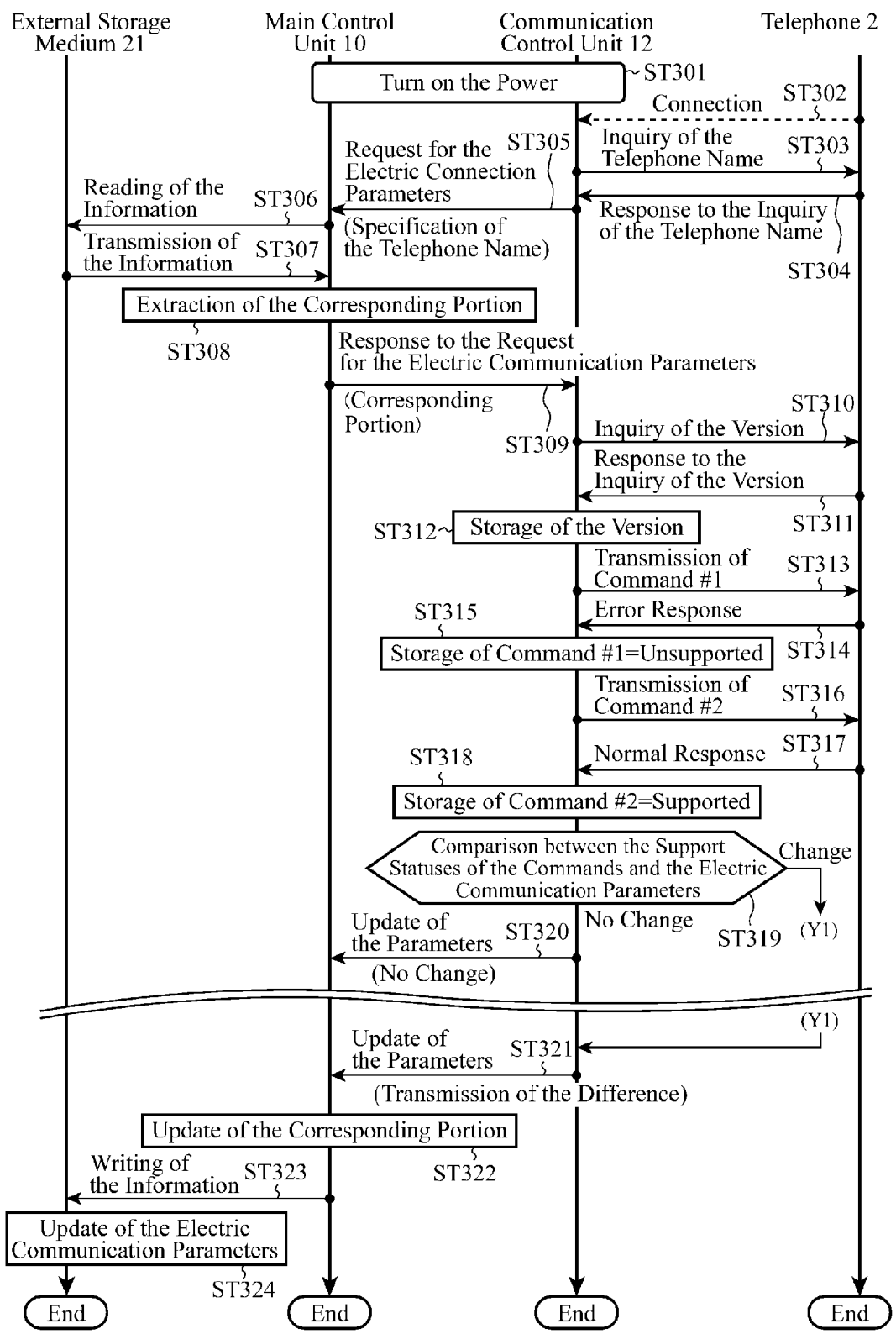
FIG. 3 is a flow chart showing an electric connection parameter file updating process carried out by the vehicle-mounted navigation device 1 in accordance with Embodiment 1 of the present invention.

FIG. 3 is a sequence diagram showing the operation of the navigation device in accordance with Embodiment 1 of the present invention, and shows a flow of operations among the external storage medium 21, the main control unit 10 and the communication control unit 12 of the vehicle-mounted navigation device 1, and the telephone 2 which are shown in FIG. 1.

Hereafter, an operation of updating the electric connection parameter file 100 of the vehicle-mounted navigation device 1 in accordance with Embodiment 1 of the present invention shown in FIG. 1 will be explained in detail with reference to the sequence diagram of FIG. 3.

It is assumed that electric power is supplied to the vehicle-mounted navigation device 1 first (step ST301), and a wireless connection between the wireless telephone 2b and the vehicle-mounted navigation device 1 is established via the short distance radio communications 1b (step ST302).

As a result, when the communication control unit 12 of the vehicle-mounted navigation device 1 inquires of the wireless telephone 2b connected thereto about the telephone name (step ST303), the wireless telephone 2b informs its own telephone name to the communication control unit 12 (step ST304). The communication control unit 12 then issues a request to read the information of the electric connection parameter file 100 on the basis of the telephone name which the communication control unit has acquired previously from the response of the wireless telephone 2b to the main control unit 10 (step ST305).

When receiving the request to read the electric connection parameter file 100, the main control unit 10 accesses the external storage medium 21 via the external storage control unit 14 and the external storage IF unit 17 to read the electric connection parameter file 100 of the corresponding wireless telephone 2b (steps ST306 to ST308). The main control unit 10 then transmits the read electric connection parameter file 100 to the communication control unit 12 (step ST309: electric connection parameter response).

The communication control unit 12 which has received the transmission of the electric connection parameter file 100 inquires of the wireless telephone 2b connected thereto via radio about the version information of the software which the wireless telephone 2b has (step ST310: version checking). The communication control unit 12 which has acquired the version information which is a response to the inquiry from the wireless telephone 2b stores the version information in a built-in memory thereof (steps ST311 and ST312).

The communication control unit 12 then transmits a command #1 to the wireless telephone 2b with which the wireless connection has been established (step ST313), and receives a response to the command #1 to judge the support status of the command #1 of the wireless telephone 2b with which the wireless connection has been established. In this case, when the communication control unit receives an error response (step ST314), the communication control unit 12 stores information showing that the wireless telephone 2b does not support (unsupports) the command #1 in the built-in memory (RAM) (step ST315).

Next, the communication control unit 12 similarly transmits a command #2 (step ST316), and receives a response to the command #2 to judge the support status of the command #2 of the wireless telephone 2b with which the wireless connection has been established. In this case, when the communication control unit receives a normal response (step ST317), the communication control unit 12 stores information showing that the wireless telephone 2b supports the command #2 in the built-in memory (step ST318). After that, according to the same procedure as that mentioned above, the communication control unit 12 judges the support status of each of the commands #3 to #N of the wireless telephone 2b, and stores the results of the judgment in the built-in memory.

After ending the above-mentioned judgment of the command support status, the communication control unit 12 makes a comparison between the current support statuses of the commands and the electric connection parameter file 100 which the communication control unit has acquired previously, as well as a comparison between the current version name and the version name of the wireless telephone 2b which the communication control unit has acquired previously (step ST319).

When judging that there is no change in the electric connection parameter file ("there is no change" in step ST319), the communication control unit informs the main control unit 10 that there is no change in the electric connection parameter file 100 (step ST320). In contrast, when judging that there is a change in the electric connection parameter file ("there is a change" in step ST319), the communication control unit acquires the difference between them and transmits parameter information corresponding to the difference to the main control unit 10 (step ST321). The main control unit 10 which has acquired this difference through the transmission then updates the corresponding parameters (step ST322), and writes the corresponding parameters in the external storage medium 21 via the external storage control unit 14 and the external storage IF unit 17 (step ST323: writing of information) to update the descriptions of the electric connection parameters 100 which the main control unit has stored in the external storage (step TS324).

In the above-mentioned navigation device in accordance with Embodiment 1, after acquiring the electric connection parameter file 100 from the external storage medium 21 via the main control unit 10, the communication control unit 12 carries out the inquiry of the telephone 2 connected thereto regarding the version information, the judgment of the supported commands, and the storage in turn. When this judgment process is completed, the communication control unit 12 makes a comparison between the current support statuses of the commands and the electric connection parameter file 100 which has been transmitted thereto via the main control unit 10, and, when there is a difference between them, transmits parameter information corresponding to the difference to update the old electric connection parameter file 100 stored in the external storage medium 21.

Because the navigation device in accordance with Embodiment 1 of the present invention can establish subsequent communication connections by only updating the electric connection parameter file 100, the number of man-hours that the developer of the navigation device needs to develop the navigation device can be reduced and the quality of the software can be improved. Furthermore, because the navigation device has only to update the parameter file, but does not have to update the software, the load on the user can also be reduced. In addition, by only rewriting the external storage medium 21 connected to the navigation device, the connectivity with the telephone 2 at the time of subsequent connections can be improved.

In above-mentioned Embodiment 1, the electric connection parameter file 100 is stored in the external storage medium 21 connected to the vehicle-mounted navigation device 1. As an alternative, the server 5 can carry out centralized management of a plurality of electric connection parameter files 100 transmitted from a plurality of vehicle-mounted navigation devices 1 connected thereto. In this case, there is provided an advantage of enabling the vehicle-mounted navigation device 1 mounted in each vehicle to share a learned electric connection parameter file 100.

Embodiment 2

In above-mentioned Embodiment 1, the vehicle-mounted navigation device 1 that updates the electric connection parameter file 100 is explained. Hereafter, as Embodiment 2, a vehicle-mounted navigation device 1 that updates a communication environment parameter file 200 will be explained.

The vehicle-mounted navigation device 1 and an adaptive communication system in accordance with Embodiment 2 employ the same configuration as the vehicle-mounted navigation device 1 and the adaptive communication system shown in FIG. 1, like in the case of Embodiment 1.

FIGS. 4(a) and 4(b) are views showing an example of the data structure of the communication environment parameter file 200 created by the vehicle-mounted navigation device 1 in accordance with Embodiment 2 of the present invention.

As shown in FIG. 4(a), the communication environment parameter file 200 has entries consisting of data fields of area 201, carrier 202, communication method 203, radio wave level 204, connection response time 205, number of connections 206, and transmission rate 207.

As mentioned above, the vehicle-mounted navigation device 1 in accordance with Embodiment 2 of the present invention stores, as well as communication areas 201 (e.g., areas corresponding to map meshes), the carrier 202, the radio wave level 204, such as an RSSI (Received Signal Strength Indicator), the connection response time 205 that elapses before the navigation device receives a response from the base station device 4 after the user issues a connection request, the number of connections 206 showing the number of times that the navigation device makes an attempt to connect with the telephone before a connection between the navigation device and the telephone is established, and the transmission rate 207 for each of the communication methods 203 (e.g., for each of 1× and EVDO (Evolution-Data Optimized/only)) in CDMA (Code Division Multiple Access) which the carrier 202 employs) for use in each of the communication areas 201, as the communication environment parameter file 200. The vehicle-mounted navigation device 1 in accordance with Embodiment 2 improves the connectivity thereof with the telephone by utilizing the communication environment parameter file at the time of establishing a connection with the telephone 2 the next time and subsequent times.

FIG. 4(b) shows an example of the communication environment parameter file 200 of the same carrier 202 for another communication method 203 (referred to as a communication method B), and this communication environment parameter file has the same data structure as that shown in FIG. 4(a).

Figure 6:
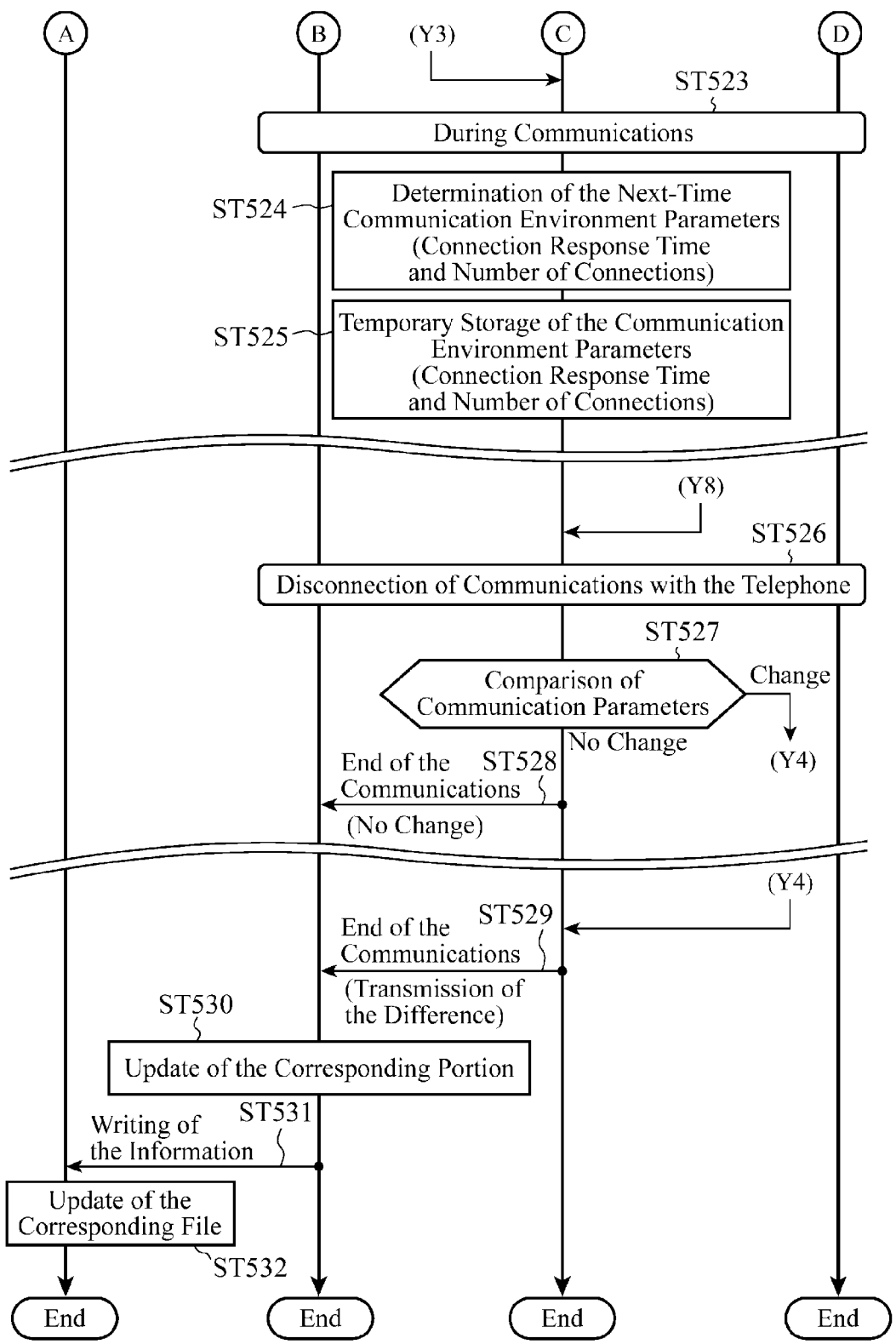
FIG. 6 is a flow chart (2) showing the communication environment parameter file updating process carried out by the vehicle-mounted navigation device 1 in accordance with Embodiment 2 of the present invention.

FIGS. 5 and 6 are sequence diagrams (1) and (2) showing the operation of the vehicle-mounted navigation device 1 in accordance with Embodiment 2 of the present invention. A flow of operations among an external storage medium 21, a main control unit 10, a communication control unit 12 and a telephone 2 which are shown in FIG. 1 is shown in the figures.

Hereafter, an operation of updating the communication environment parameter file 200 of the vehicle-mounted navigation device 1 in accordance with Embodiment 2 of the present invention shown in FIG. 1 will be explained in detail with reference to the sequence diagrams of FIGS. 5 and 6.

After updating an electric connection parameter file 100 as mentioned above (step ST501 of FIG. 5), the communication control unit 12 of the vehicle-mounted navigation device 1 specifies a carrier and a communication method to make a request of the main control unit 10 for acquisition of a communication environment parameter file 200 (step ST502).

The main control unit 10 reads the communication environment parameter file 200 corresponding to the specified carrier and communication method from the external storage medium 21 (step ST503), and stores the communication environment parameter file 200 transmitted thereto from the external storage medium 21 in a main storage unit 11 (steps ST504 and ST505) and also delivers a storage destination address showing a location at which the communication environment parameter file is stored in the main storage unit 11, instead of the communication environment parameter file 200, to the communication control unit 12 (step ST506).

After performing the above-mentioned preparatory tasks, when the user performs an operation of starting communications by using an information input unit 19, the main control unit 10 accepts a communications start request which is created through the user's operation on the information input device 19 via a information input control unit 15, and issues a connection request to the communication control unit 12 (step ST507). At this time, the main control unit 10 acquires the current position information of the vehicle from GPS satellites 30 via a current position acquisition IF unit 13, and delivers the current position information to the communication control unit 12.

The communication control unit 12 which has received the communications start request reads the electric connection parameter file 100 stored in the main storage unit 11 (step ST508), and also reads the communication environment parameter file 200 from the main storage unit 11 according to the storage location address which has been delivered thereto from the main control unit 10 (step ST509). The communication control unit 12 then adds +1 to a reference number of connections to set the addition result as an argument which defines a limit of the counted number of connections (step ST510), and the number of connections set in this step is decremented by 1 and the decremented number of connections is newly set as the number of connections (step ST511).

In this case, every time when the communication control unit repeatedly tries to establish a communication connection, the communication control unit manages the number of connections by decrementing the number of connections by 1.

The communication control unit 12 also starts counting using a built-in connection response timer (step ST512) to start a measurement of the connection response time (step ST513). The communication control unit 12 then transmits a supported command #2 included in the acquired electric connection parameter file 100 to the telephone 2 (the wireless telephone 2b) (step ST514), and tries to establish a communication connection with the wireless telephone 2b when receiving a normal response from the wireless telephone 2b (steps ST515 and ST516).

Next, the communication control unit 12 stops the counting using the connection response timer (steps ST517 and ST518), and judges whether it has succeeded in establishing the connection (step ST519).

At this time, when not having succeeded in establishing the connection (if "NO" in step ST519), the communication control unit 12 further judges the number of connections (step ST520).

When, in this step, the number of connections>0 is satisfied (if "YES" in step ST520), the communication control unit repeats the process of updating the number of connections by −1 of step ST511 and the subsequent processes, whereas when the number of connections>0 is not satisfied (if "NO" in step ST520), the communication control unit measures the communication environment parameters consisting of the connection response time and the number of connections which will be effective the next time and the subsequent times (step ST521). The communication control unit 12 then updates the communication environment parameters on the basis of the measurement results (step ST522). A method of measuring the communication environment parameters consisting of the connection response time and the number of connections will be mentioned below. After the communications with the telephone 2 (the wireless telephone 2b) are disconnected, the communication environment parameters updated above are reflected in the communication environment parameter file 200 stored in the external storage medium 21, as will be mentioned below.

In contrast, when it is judged in the connection judgment process of step ST519 that the communication control unit has succeeded in establishing the connection (if "YES" in step ST519), the vehicle-mounted navigation device 1 and the wireless telephone 2b make a transition to a communication state in which they are communicating with each other (step ST523 of FIG. 6).

After they make a transition to the communication state, the communication control unit 12 measures (determines) the communication environment parameters consisting of the connection response time and the number of connections which will be effective the next time and the subsequent times (step ST524), and updates the communication environment parameters on the basis of the results of this determination and stores the updated communication environment parameters in the main storage unit 11 temporarily (step ST525). After disconnecting the communications with the telephone (step ST526), the communication control unit 12 compares the updated communication environment parameters with the communication environment parameter file 200 which the communication control unit has acquired previously (step ST527), and, when there is no difference between them ("there is no change" in step ST527), informs the completion of the communications, as well as no change in the communication environment parameter file 200, to the main control unit 10 (step ST528). In contrast, when there is a difference between tem ("there is a change" in step ST527), the communication control unit 12 extracts the parameter information corresponding to the difference and transmits this extracted parameter information to the main control unit 10 to inform the completion of the communications to the main control unit 10 (step ST529).

The main control unit 10 which has acquired the parameter information about the difference from the communication control unit 12 through the transmission of the parameter information updates the communication environment parameter file 200 stored temporarily in the main storage unit 11 on the basis of the parameter information (step ST530), and also transmits the updated communication environment parameter file 200 to the external storage medium 21 via the external storage control unit 14 and the external storage IF unit 17 (step ST531) to rewrite the corresponding communication environment parameter file 200 stored in the external storage medium 21 by updating the communication environment parameter file 200. The main control unit 10 then reflects the parameter information including the connection response time and the number of connections, which have been acquired through the measurement, and corresponding to the difference in the communication environment parameter file 200 (step ST532).

An example of the method of determining the connection time is shown in FIG. 7(*a*) in a tabular form, and an example of the method of determining the number of connections is shown in FIG. 7(*b*) in a tabular form.

As shown in FIG. 7(*a*), the communication control unit 12 sets a value which the communication control unit acquires by subtracting a reference value (a reference timer [seconds]) from the actual connection response time measured as an offset, adds the reference value and the offset, and sets the addition result as the connection response time which will be used from then on. "*" in FIG. 8 shows a case (NULL state) in which there is no response. Furthermore, as shown in FIG. 7(*b*), the communication control unit 12 sets a value which the communication control unit acquires by subtracting the reference number of connections from the actual number of connections measured as an offset, adds the reference number of connections and the offset, and sets the addition result as the number of connections which will be used from then on.

FIG. 8(*a*) is a view showing an example of a statistical determination operation of determining the reference value of the connection response time in a tabular form, and FIG. 8(*b*) is a view showing a graphical representation of a method of determining an optimal reference value which is used for measurement of the connection response time from the value determined by using the method shown in FIG. 8(*a*).

As shown in FIG. 8(*a*), the main control unit 10 acquires information about the connection response time which has been acquired through the determination from the communication control unit 12, and carries out the statistical process about the number of connections, an accumulation of the number of connections, and an accumulation ratio for each of n (n: an arbitrary integer) categorized connection response time zones, in this case, six categorized connection response time zones. Next, the main control unit 10 determines a frequency distribution in which the scale of the horizontal axis is graduated in units of the connection response time, and the scales of the vertical axis are graduated in units of the number of connections and the accumulation ratio, as shown in FIG. 8(*b*), and determines a predefined point, e.g., an upper limit (RT$_P$) of the connection response time or a preset value (RT$_S$) of the accumulation ratio as the optimal reference value.

In the navigation device in accordance with above-mentioned Embodiment 2, after updating the electric connection parameter file 100, the communication control unit 12 specifies a carrier and a communication method to acquire an environmental parameter file 200 from the external recording medium 21. After the user makes the navigation device start trying to establish a communication connection, and then receiving a communication connection request from the main control unit 10, the communication control unit 12 then reads the electric connection parameter file 100 and the communication environment parameter file 200 which the communication control unit has acquired previously, and tries to establish a communication connection with the wireless telephone 2b by using those parameters. Furthermore, after having succeeded in establishing the connection and then making a transition to a communication state, the communication control unit 12 measures the next-time communication environment parameters (in this case, the connection response time and the number of connections), and transmits the communication environment parameters to the main control unit 10 at the time when the communication control unit fails in communicating with the telephone 2b or the communications are disconnected intendedly.

Next, the main control unit 10 which has acquired the updated communication environment parameter file 200 from the communication control unit 12 updates the communication environment parameter file 200 only when the communication environment parameters have a difference, and then updates the communication environment parameter file 200 stored in the external storage medium 21.

Because the vehicle-mounted navigation device 1 in accordance with Embodiment 2 of the present invention rewrites the external storage medium 21 connected to the vehicle-mounted navigation device 1, thereby being able to optimize the parameters according to the network state from then on, there is provided an advantage of being able to improve the connectivity of the navigation device with the network and reduce the load on the user.

In above-mentioned Embodiment 2, the communication environment parameter file 200 is stored in the external storage medium 21 connected to the vehicle-mounted navigation device 1. As an alternative, the server 5 can carry out centralized management of this communication environment parameter file 200. In this case, there is provided an advantage of enabling the vehicle-mounted navigation device 1 mounted in each vehicle to share the communication environment parameter file 200.

Furthermore, the above explanation is made by assuming that the main control unit 10 built in the vehicle-mounted navigation device 1 measures and stores the connection response time and the number of connections which are included in the communication environment parameter file 200, and then carries out the statistical process. As an alternative, the server 5 can carry out the statistical process and centralized management of the communication environment parameter file. In this case, while the load on each vehicle-mounted navigation device 1 can be reduced, a learned communication environment parameter file 200 can be acquired, and this results in an improvement in the connectivity of each vehicle-mounted navigation device 1 and contributes to an improvement in the communication quality.

Embodiment 3

In above-mentioned Embodiment 2, the procedure for updating the communication environment parameter file 200 is explained. In contrast, in Embodiment 3 which will be explained below, a vehicle-mounted navigation device 1 that can carry out automatic switching to an optimal communication method by monitoring the communication state using an updated communication environment parameter file 200 will be explained.

Also in Embodiment 3 which will be explained below, the vehicle-mounted navigation device 1 and an adaptive communication system use the same configuration as that of the vehicle-mounted navigation device 1 and the adaptive communication system which are shown in FIG. 1, like in the case of Embodiments 1 and 2. Furthermore, the communication environment parameter file 200 has the same data structure as that shown in FIGS. 4(a) and 4(b), like in the case of Embodiment 2.

Figure 10:
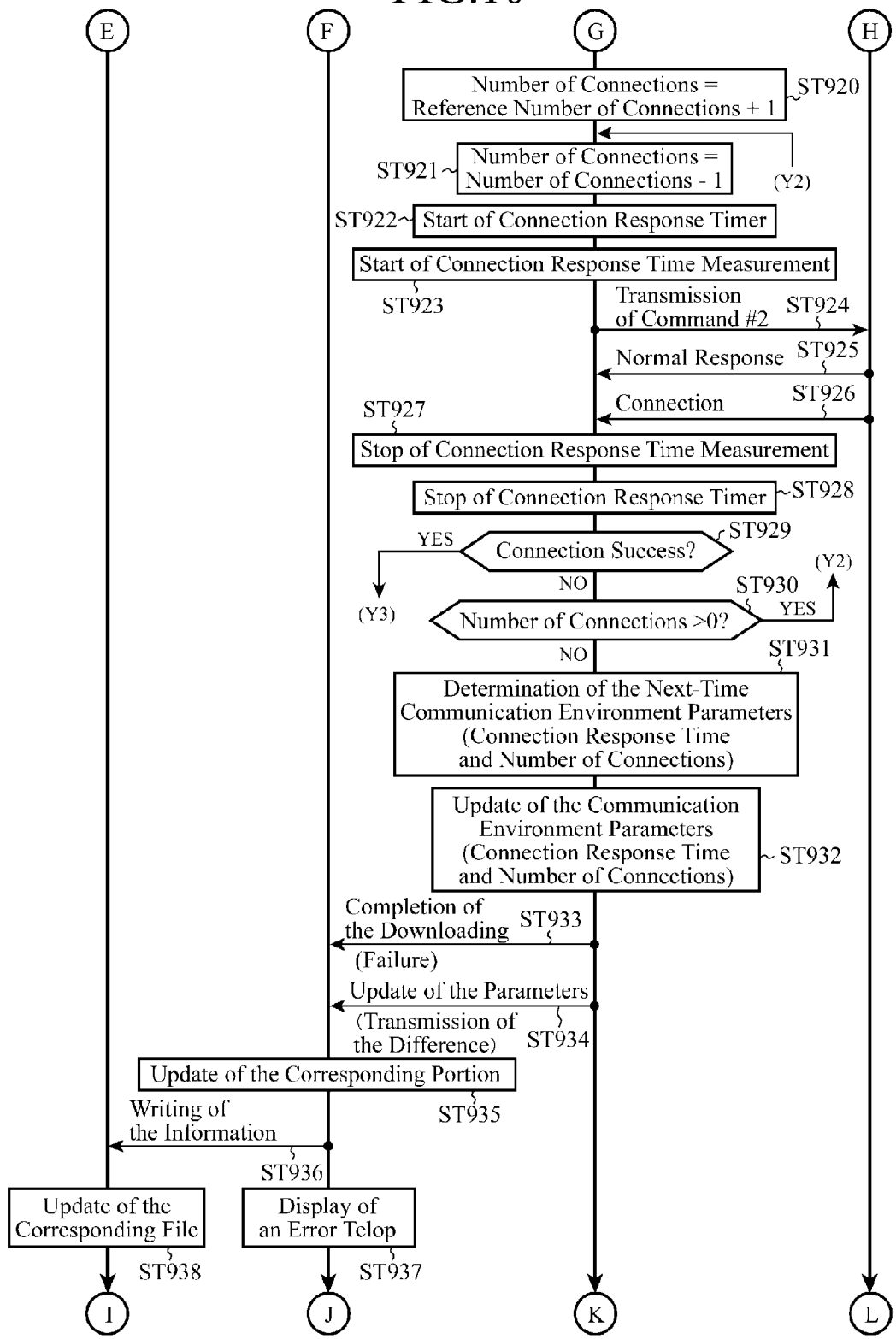
FIG. 10 is a flow chart showing a middle stage of the optimal communication control operation of the vehicle-mounted navigation device 1 in accordance with Embodiment 3 of the present invention.
Figure 11:
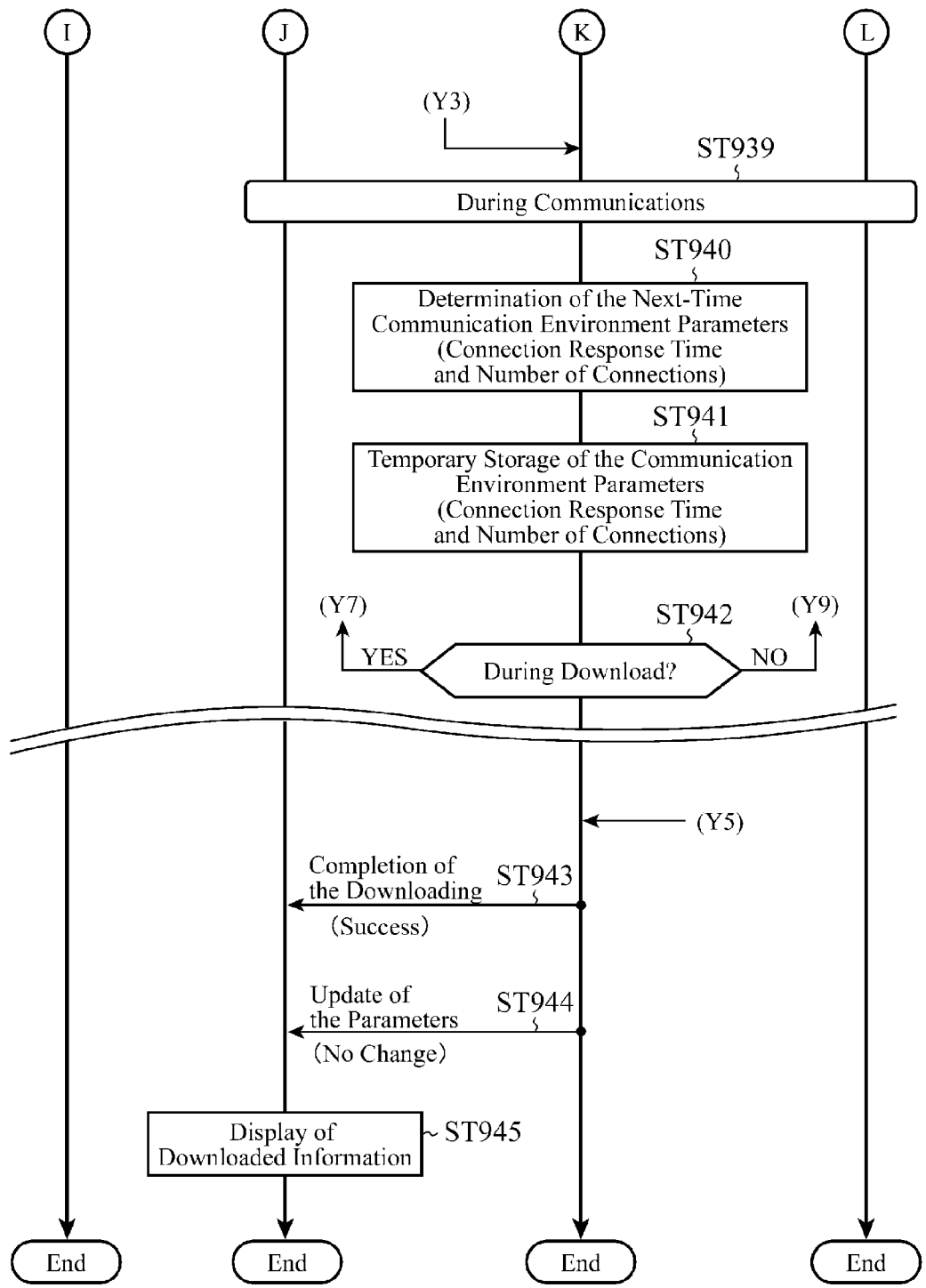
FIG. 11 is a flow chart showing a last stage of the optimal communication control operation of the vehicle-mounted navigation device 1 in accordance with Embodiment 3 of the present invention.

FIGS. 9 to 11 are sequence diagrams showing the operation of the vehicle-mounted navigation device 1 in accordance with Embodiment 3 of the present invention, a first stage, a middle stage and a last stage of the operation being separately shown in the figures respectively. A flow of operations among an external storage medium 21, a main control unit 10, a communication control unit 12, a telephone 2 which are shown in FIG. 1 is shown in FIGS. 9 to 11.

Hereafter, an optimal communication control operation of the navigation device in accordance with Embodiment 3 of the present invention shown in FIG. 1 will be explained in detail with reference to the sequence diagrams of FIGS. 9 to 11.

Hereafter, an operation of step ST900 and subsequent steps which the navigation device performs after updating the communication environment parameter file 200 and then making a transition to a communication state will be explained.

When the user operates an information input unit 19 during communications to cause the navigation device to issue a download start request, the main control unit 10 detects this request by using an information input control unit 15, attaches information showing the current position of the vehicle acquired by a current position acquisition IF unit 13 to the request, and makes a download request of the communication control unit 12 (step ST901). The communication control unit which has received the download request reads the communication environment parameter file 200 from a main storage unit 11 (step ST902), extracts information about a connection response time 205, a number of connections 206, and a transmission rate 207 of a corresponding area 201, and makes a data download request of a server 5 connected to a mobile communication network 3 via a wireless telephone 2b (step ST904) after temporarily storing the extracted information in a built-in memory (step ST903).

The communication control unit 12 measures the transmission rate of downloaded data transmitted, via the mobile communication network 3 and the wireless telephone 2b, from the server 5 while receiving the downloaded data (steps ST905 and ST906). When the reception is not completed (if "No" in step ST907), the communication control unit judges the transmission rate of the downloaded data (step ST908).

The communication control unit 12 then makes a comparison between the measured transmission rate and the transmission rate 207 included in the communication environment parameter file 200 which the communication control unit has read previously (step ST909). When the measured transmission rate is then equal to or higher than a parameter value (a threshold) (if "YES" in step ST909), the communication control unit 12 continues the download process. In contrast, when the measured transmission rate is lower than the threshold (if "NO" in step ST909), the communication control unit inquires of the main control unit 10 about the information about the current position of the vehicle (step ST910), acquires a response showing the current position to perform area matching with the communication environment parameters (steps ST911 and ST912), and judges the receive level (RSSI value) in the communication area (step ST913).

Next, the communication control unit 12 compares the judged receive level with a threshold (step ST914), and, when the receive level is equal to or lower than the threshold at which the communication control unit cannot maintain the communications (if "NO" in step ST914), makes a request of the server 5 via the wireless telephone 2b and the mobile communication network 3 to suspend the downloading (step ST915).

After that, the communication control unit 12 judges whether or not the wireless telephone supports another communication method with reference to the communication environment parameter file 200 (step ST916), and, when the wireless telephones 2b supports another communication method, e.g. CDMA, and the communication control unit fails in communicating with the wireless telephones by using 1×, temporarily disconnects the communications with the wireless telephone 2b (step ST917) if the wireless telephone supports EVDO (if "there is another supported communication method" in step ST916), and then changes the communication method to EVDO (step ST918) and tries to establish a communication connection with the wireless telephone 2b according to the connection response time 205 and the number of connections 206 of the communication environment parameter file 200. In contrast, when the wireless telephone does not support EVDO, that is, when the wireless telephone does not support any other communication method (if "there is no other supported communication method" in step ST916), the communication control unit 12 returns to the current position inquiry process of step ST910.

The subsequent operation is the same as the operation which is performed after the wireless telephone 2b is connected. The communication control unit 12 adds +1 to a reference number of connections to set the addition result as the number of connections (step ST920 of FIG. 10), and subtracts 1 from the set number of connections and then sets the subtraction result as the number of connections (step ST921). The communication control unit 12 also starts counting using a built-in connection response timer (step ST922) to start a measurement of the connection response time (step ST923).

The communication control unit 12 then transmits a supported command #2 included in the acquired electric connection parameter file 100 to the wireless telephone 2b (step ST924), and tries to establish a communication connection when receiving a normal response from the wireless telephone 2b (steps ST925 and ST926). Next, the communication control unit 12 stops the measurement of the connection response time (step ST927), stops the counting using the connection response timer (steps ST928), and judges whether the communication control unit has succeeded in establishing the connection (step ST929).

At this time, when having succeeded in establishing the connection (if "YES" in step ST929), the vehicle-mounted navigation device 1 makes a transition to a communication state in which the vehicle-mounted navigation device is communicating with the wireless telephone 2b. In contrast, when not having succeeded in establishing the connection (if "NO" in step ST929), the communication control unit 12 further judges the number of connections (step ST930).

When the number of connections>0 is satisfied (if "YES" in step ST930), the communication control unit repeats the process of updating the number of connections by −1 of step ST921 and the subsequent processes, whereas when the number of connections>0 is not satisfied (if "NO" in step ST930), the communication control unit measures (determines) the communication environment parameters consisting of the connection response time and the number of connections which will be effective the next time and the subsequent times (step ST931). The communication control unit 12 then updates the communication environment parameters on the basis of the measurement results (step ST932). A method of determining the parameters regarding the connection response time and the number of connections is as explained with reference to FIGS. 7(*a*) and 7(*b*), and the explanation of the method will be omitted hereafter to avoid the duplication.

Next, the communication control unit 12 informs the completion of the downloading (or a failure in the downloading) to the main control unit 10 (step ST933), and, on the basis of the connection response time and the number of connections which have been measured, determines a difference between the measured communication environment parameters and the stored communication environment parameters (the connection response time and the number of connections) and transmits parameter information corresponding to the difference between them to the main control unit 10 (step ST934).

The main control unit 10 updates the communication environment parameter file 200 stored in the main storage unit 11 on the basis of the parameter information corresponding to the difference which the main control unit has acquired through the transmission (step ST935), simultaneously transmits the communication environment parameter file to the external storage medium 21 to rewrite the communication environment parameter file stored in the external storage medium 21 (step ST936), and displays an error telop showing a download failure on an information display unit 20 via an information display control unit 16 (step ST937). The main control unit 10 also rewrites the communication environment parameter file stored in the external storage medium 21 on the basis of the updated communication environment parameter file 200 (step ST938).

In contrast, when, in the connection determination process of step ST929, determining that the communication control unit has succeeded in establishing the connection (if "YES" in step ST929), the vehicle-mounted navigation device 1 and the wireless telephone 2*b* make a transition to a communication state in which they are communicating with each other (step ST939 of FIG. 11).

After they make a transition to the communication state, the communication control unit 12 measures (determines) the communication environment parameters consisting of the connection response time and the number of connections which will be effective the next time and the subsequent times (step ST940), and updates the communication environment parameters on the basis of the results of this determination and stores the updated communication environment parameters in the main storage unit 11 temporarily (step ST941).

Next, the communication control unit 12 judges whether or not data is being downloaded (step ST942), and, when data is being downloaded (if "YES" in step ST942), repeats the downloaded data receiving process of step ST904 and subsequent steps of FIG. 9, whereas when no data is being downloaded (if "NO" in step ST942), the communication control unit waits for a download start operation request from the user and returns to the download request process of step ST901 of FIG. 9.

When receiving the completion of reception of the downloaded data (if "YES" in step ST907 of FIG. 9), the communication control unit informs the completion and success of the downloading to the main control unit 10 (step ST943), and then informs the main control unit that there is no change in the communication environment parameter file 200 (step ST944). The main control unit 10 which has received these pieces of information displays the downloaded information on the information display unit 20 via the information display control unit 16 (step ST945), and ends the series of above-mentioned processes.

In the vehicle-mounted navigation device 1 in accordance with above-mentioned Embodiment 3 of the present invention, the communication control unit 12 monitors the transmission rate while data is downloaded, and, when the transmission rate is equal to or lower than the communication environment parameter value, measures the receive level in the area, and suspends the downloading, switches to another communication method and tries to establish a communication connection again when the communication control unit cannot maintain the communications.

Thus, because the communication control unit also handles, as the parameter file (the communication environment parameter file 200), the communication area and the communication method, the navigation device can detect degradation in the communication quality by using an objective method. As a result, the navigation device can carry out active communication control, such as switching to an appropriate communication method in the communication area, and suppression of useless communications. Furthermore, because the navigation device automatically performs the above-mentioned switching to another communication method, the load on the user at the time of performing an operation can be reduced.

Embodiment 4

Figure 12:
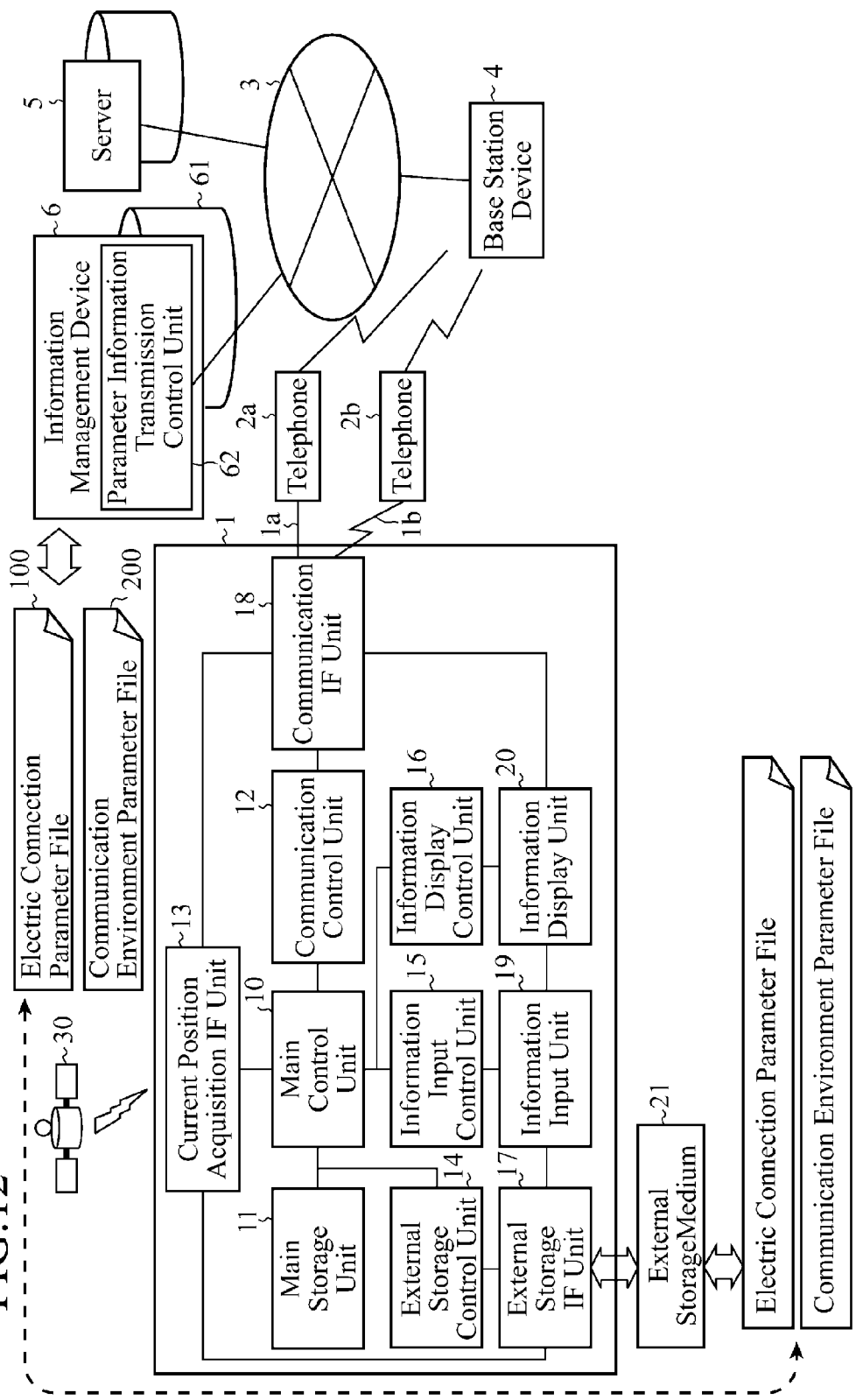
FIG. 12 is a block diagram showing the configuration of a vehicle-mounted navigation device 1 and an adaptively-controlled communication system in accordance with Embodiment 4 of the present invention.

FIG. 12 is a block diagram showing the configuration of a vehicle-mounted navigation device 1 and an adaptively-controlled communication system in accordance with Embodiment 4 of the present invention.

Embodiment 4 differs from Embodiment 1 shown in FIG. 1 only in that an information management device 6 is further connected to a mobile communication network 3, the information management device 6 is made to carry out centralized management of an electric connection parameter file 100 and a communication environment parameter file 200, and an indefinite number of users are allowed to share and use the electric connection parameter file 100 and the communication environment parameter file 200 managed by the information management device 6. As an alternative, a server 5 can have the functions of the information management device 6. The vehicle-mounted navigation device 1 has the same configuration as that of Embodiment 1 shown in FIG. 1.

As shown in FIG. 12, the information management device 6 is comprised of a storage unit 61 for storing parameter information about a command support status or communication connection environment of a wired telephone 2*a* and those of a wireless telephone 2*b*, which is transmitted from the vehicle-mounted navigation device 1, and a parameter information transmission control unit 62 for updating the parameter information stored in the storage unit 61 in response to an update request from the vehicle-mounted navigation device 1, and for, in response to a transmission request from the vehicle-mounted navigation device 1, transmitting the updated parameter information stored in the storage unit 61 to the vehicle-mounted navigation device 1 which has made the request.

The vehicle-mounted navigation device 1 in accordance with above-mentioned Embodiment 4 of the present invention can acquire the electric connection parameter file 100 and the communication environment parameter file 200 via the mobile communication network 3 even through the vehicle-mounted navigation device 1 does not have the external storage medium 21.

Furthermore, because an indefinite number of users are allowed to share these parameters, the lot of parameters can also contribute to an improvement in the degree of accuracy of a reference value by utilizing a statistical method. Therefore, there is provided an advantage of being able to make the adaptively-controlled communication system operate more properly.

In Embodiments 1 to 4 of the present invention, only the vehicle-mounted navigation device 1 is shown as an example. However, the present invention is not limited to the vehicle-mounted navigation device 1, and can also be applied to a mobile phone, a PDA (Personal Digital Assistants), a game machine, a PC, and so on having the navigation functions.

The functions of each of the configuration blocks which the navigation device in accordance with any of Embodiments 1 to 4 of the present invention has can be implemented via software, or at least a part of the functions can be implemented via hardware.

For example, either the communication control unit 12 that communicates with the server 5 by using the telephone 2, and measures the parameter information about the command support status or communication connection environment of the telephone 2, or data processing carried out by the main control unit 10 that transmits the parameter information measured by the communication control unit 12 to the external storage medium 21 or the server 5, and that controls subsequent communications according to the parameter information transmitted to the external storage medium 21 or the server 5 can be implemented on a computer via one or more software programs, or at least apart of the communication control unit or the data processing carried out by the main control unit can be implemented via hardware.

INDUSTRIAL APPLICABILITY

As mentioned above, in order to reduce the load imposed on the user and be able to carry out communications while preventing useless communications from occurring, the navigation device in accordance with the present invention includes a communication control unit for communicating, via a mobile communication network, with a server by way of a telephone connected thereto via cable or radio to measure parameter information about a command support status or communication connection environment of the above-mentioned telephone, and a main control unit for transmitting the parameter information measured by the above-mentioned communication control unit to an external storage medium or the above-mentioned server, and for controlling subsequent communications according to the parameter information transmitted to the above-mentioned external storage medium or the above-mentioned server. The navigation device in accordance with the present invention is suitable for use in an online demand traffic parameter information service system via mobile phone connections. More particularly, the navigation device in accordance with the present invention is suitable for use as a vehicle-mounted navigation device mounted in a vehicle.

The invention claimed is:

1. A navigation device connected, via a mobile communication network, to a server by way of a telephone connected thereto via cable or radio, said navigation device comprising:
   a communication control unit for communicating with said server by using said telephone to measure parameter information about a command support status or communication connection environment of said telephone; and
   a main control unit for transmitting the parameter information measured by said communication control unit to an external storage medium or said server, and for controlling subsequent communications according to the parameter information transmitted to said external storage medium or said server,
   wherein:
      when there is a difference between said measured parameter information and the parameter information which has been transmitted to said external storage medium or said server, said communication control unit transmits parameter information corresponding to said difference to said main control unit, and
      said communication control unit specifies a carrier and a communication method to acquire parameter information about said communication connection environment from said external storage medium or said server via said main control unit, and, at a time which a communication connection is started and said communication control unit receives a communication connection request from said main control unit, tries to establish a connection with said telephone according to said acquired parameter information about the communication connection environment, measures, via communications with said server, parameter information about the communication connection environment including at least a connection response time and a number of connections after having succeeded in establishing said connection and making a transition to communications with said telephone, and, when there is a difference between a result of the measurement of said parameter information and said acquired parameter information about the communication connection environment, transmits parameter information corresponding to said difference to said main control unit at a time when said communication control unit fails in communicating with said telephone or the communications are disconnected.

2. The navigation device according to claim 1, wherein when a connection with said telephone is detected, said communication control unit inquires of said telephone about the telephone's name to acquire parameter information about the command support status of the corresponding telephone from said external storage medium or said server via said main control unit, and also judges the command support status via communications with said telephone and said server, and, when there is a difference between a result of said judgment and said acquired parameter information about the command support status of the corresponding telephone, transmits parameter information corresponding to said difference to said main control unit.

3. The navigation device according to claim 2, wherein said main control unit updates the parameter information about the command support status or communication connection environment of the telephone which has been transmitted to said external storage medium or said server on a basis of the parameter information corresponding to said difference transmitted from said communication control unit.

4. The navigation device according to claim 1, wherein said main control unit updates the parameter information about the command support status or communication connection environment of the telephone which has been transmitted to said external storage medium or said server on a basis of the parameter information corresponding to said difference transmitted from said communication control unit.

5. The navigation device according to claim 1, wherein said communication control unit sets a value which said communication control unit acquires by subtracting a reference value from an actual connection response time measured as an offset to said reference value to define the offset as said connection response time which will be used from then on.

6. The navigation device according to claim 5, wherein said main control unit performs a statistical process on the number of connections, an accumulation of the number of connections, and an accumulation ratio for each of connection response times which are measured by said communication control unit and are divided into n groups (n is an arbitrary integer), and uses either an upper limit of said connection response times which is determined from a frequency distribution or a preset value of the accumulation ratio as said reference value.

7. The navigation device according to claim 1, wherein said communication control unit sets a value which said communication control unit acquires by subtracting a reference number of connections from an actual number of connections measured as an offset to said reference number of connections to define the offset as said number of connections which will be used from then on.

8. The navigation device according to claim 7, wherein said main control unit performs a statistical process on the number of connections, an accumulation of the number of connections, and an accumulation ratio for each of connection response times which are measured by said communication control unit and are divided into n groups (n is an arbitrary integer), and uses either an upper limit of said connection response times which is determined from a frequency distribution or a preset value of the accumulation ratio as said reference value.

9. The navigation device according to claim 1, wherein when a download request occurs during communications, said communication control unit acquires parameter information about a current position from said main control unit, and also acquires the parameter information about said communication connection environment from said external storage medium or said server to extract the connection response time and the number of connections of a corresponding area which are included in said parameter information, monitors a transmission rate at a time of performing a download process after transmitting the download request to said server via said telephone to make a comparison between the transmission rate acquired as a result of said monitoring and the transmission rate included in said acquired parameter information, judges a receive level of the corresponding area on a basis of the current position acquired from said main control unit and according to a result of said comparison, and, when said judged receive level is in a state in which the communications cannot be maintained, makes a request to suspend said download process, and, in a case in which the telephone supports another communication method, temporarily disconnects the connection with said telephone and switches to said other communication method to establish a communication connection with said telephone according to the connection response time and the number of connections included in said parameter information.

10. The navigation device according to claim 1, wherein said navigation device is connected, via the mobile communication network, to an information management device, and wherein the communication control unit communicates with said server by using said telephone to measure the parameter information about the command support status or communication connection environment of said telephone, and the main control unit transmits the parameter information measured by said communication control unit to said information management device, and controls subsequent communications according to the parameter information transmitted to said information management device.

11. An adaptively-controlled communication system provided with one or more navigation devices each connected, via a mobile communication network, to a server by way of a telephone connected thereto via cable or radio, and an information management device connected to said one or more navigation devices via said mobile communication network, wherein:
said navigation device includes:
a communication control unit for communicating with said server by using said telephone to acquire parameter information about a command support status or communication connection environment of said telephone from an external storage medium or said server via a main control unit, and, for, when there is a difference between said acquired parameter information and parameter information which has been transmitted to said external storage medium or said server by said main control unit, transmitting parameter information corresponding to said difference to said main control unit,
said main control unit transmits the parameter information acquired by said communication control unit to said information management device, and for controlling subsequent communications according to the parameter information transmitted to said information management device,
said information management device includes:
a storage unit for storing the parameter information about the command support status or communication connection environment of said telephone which is transmitted thereto from said navigation device; and
a parameter information transmission controlling unit for updating the parameter information stored in said storage unit in response to an update request from said navigation device, and for transmitting the updated parameter information stored in said storage unit to said navigation device which has made the request in response to a transmission request from said navigation device, and
said communication control unit specifies a carrier and a communication method to acquire parameter information about said communication connection environment from said external storage medium or said server via said main control unit, and, at a time which a communication connection is started and said communication control unit receives a communication connection request from said main control unit, tries to establish a connection with said telephone according to said acquired parameter information about the communication connection environment, measures, via communications with said server, parameter information about the communication connection environment including at least a connection response time and a number of connections after having succeeded in establishing said connection and making a transition to communications with said telephone, and, when there is a difference between a result of the measurement of said parameter information and said acquired parameter information about the communication connection environment, transmits parameter information corresponding to said difference to said main control unit at a time when said communication control unit fails in communicating with said telephone or the communications are disconnected.

* * * * *